Patented Dec. 21, 1937

2,103,229

UNITED STATES PATENT OFFICE 2,103,229

PROCESS FOR MAKING WHITE CLOUDED IRON ENAMEL

Ignaz Kreidl, Vienna, Austria

No Drawing. Application November 7, 1933, Serial No. 697,068. In Austria November 28, 1932

4 Claims. (Cl. 106—36.2)

This invention relates to the production of white clouded enamel and glazes, more particularly iron enamel, in which gas clouding agents are used in conjunction with enamel frits, which, per se, show in the slip higher colloidality or greater colloidal components, as compared with ordinary enamel frits; such as forms the subject matter of earlier patent applications made by the applicant. Such enamel frits having per se higher colloidality or greater colloidal components than ordinary frits can be obtained by mechanical measures, for instance by grinding on colloidal mills. More suitable, however, are enamel frits in which the colloidal properties by chemical or colloid-chemical measures are obtained already in ordinary grinding in ordinary enamel mills. Thus, by modifying the composition of the enamel batch (that is to say the non-fused crude mixture), such as by raising the fluorine-content, frits can be obtained in which the colloidal qualities are higher even in ordinary grinding, when, as compared with ordinary frits. Thus enamel compositions which contain double the usual fluorine content of normal enamel compositions (which are compositions containing approximately 5% of fluorine) and therefore contain for example 10% of fluorine and even more, possess this property, and of the fluorine containing substances the addition of more particularly alkali silicofluoride, such as for example sodium silicofluoride alone or in conjunction with clay, felspar, or the like, has proved suitable.

Such frits can also be obtained by using an enamel composition with the usual fluorine content, in which, however, the proportion of alkali to boric acid is considerably greater than in the usual enamel compositions. This may be attained by diminishing the boron content or by increasing the alkali content, but preferably it is secured by a combination of both these expedients, that is to say by both diminishing the boron content as well as raising the alkali content. The increased quantity of alkali can be introduced in the form of all alkali-containing crude substances which are used in enamels, for instance in the form of soda, felspar and the like. In the enamel compositions mostly used the proportion of alkali to boric acid may be assumed to be on an average approximately 1.5 parts of alkali to 1 part of boric acid. The ratio of alkali to boric acid can the more approach this lowest limit the smaller the absolute fluorine-content of the frit is. For making an enamel frit according to the present invention enamel compositions are preferable in which the ratio of alkali to boric acid is above 2:1, as for instance from 3:1 to 5:1, the alkali content of any alkali-containing fluorine compound which may have been added not being counted in.

It is advantageous also to raise the aluminium content and therefore for example the addition of clay, felspar or the like to the crude mixture.

The most favorable composition for the frits can be established in every case empirically by means which are known in colloidal chemistry.

When using such frits, the drawback frequently arises that the enamel acquires a veiling or becomes matt or dimmed during the burning.

The invention depends upon the discovery that this drawback can be avoided by diminishing the influence on the clay of the substances present in the enamel slip which favor the water binding of the clay, without impairing the adsorption capability of the clay. According to the invention therefore substances are added to the enamel in the mill which can bring about at least a partial conversion of the compounds present in the slip which favor the water binding of the clay, such as for example soda, borax and the like, obviously with formation of substances having a weaker action on the clay, without the adsorption capability of the clay being impaired by the addition of the said substances. Such substances are more particularly hydrochloric acid or substances which yield hydrochloric acid, preferably hydrochloric acid salts with volatile bases, further ammonium formate and the like.

Ammonium chloride may be mentioned as an example of a substance which is extraordinarily effective, and which exerts its action when present in very small quantities. According to the invention the ammonium chloride is added in quantities of 0.5 to 2 parts of 1000 calculated on the enamel frit. Instead of ammonium chloride a quantity of hydrochloric acid corresponding to this quantity of ammonium chloride may be used, but ammonium chloride is to be preferred to hydrochloric acid.

The addition of hydrochloric acid or of ammonium chloride on the mill has nothing whatever to do with the known use of adjusting or setting-up agents which moreover have to be added in much greater quantities.

*Examples*

| | Grams |
|---|---|
| 1. Colloidal frit | 1000 |
| Clay | 100 |
| Methylene blue as clouding agent | 0.25 |
| Salt peter | 0.4 |
| Ammonium chloride | 1 | are ground up in the mill with approximately 450 grams of water. Instead of ammonium chloride 2.5 cc. of commercial hydrochloric acid (30%) may be used.

2. 
| | Grams |
|---|---|
| Colloidal frit | 1000 |
| Clay | 100 |
| Tar (dry) | 0.5 |
| Salt peter | 0.4 |
| Ammonium chloride | 1 | are ground up in the mill with approximately 450 grams of water.

Examples of colloidal frits are:

a.
| | Grams |
|---|---|
| Borax approximately | 24.6 |
| Sodium carbonate | 3.2 |
| Potassium nitrate | 4.2 |
| Calc spar (calcium carbonate) | 1.6 |
| Sodium fluosilicate | 20 |
| Felspar | 24.6 |
| Kaolin | 2.1 |
| Quartz | 25.7 | b.
| | Grams |
|---|---|
| Borax approximately | 15 |
| Felspar | 34 |
| Quartz | 20 |
| Sodium fluosilicate | 12 |
| Fluorspar | 2.1 |
| Sodium carbonate | 20.8 |
| Potassium nitrate | 3.0 |
| Kaolin | 6.2 |

In the claims, by the expression "acting as acids" I intend to cover, acid reacting salts, salts yielding acid on warming and salts which have an acid reaction when hydrolyzed.

What I claim is:

1. In a method of producing a metallic article having thereon a coating of clouded vitreous enamel having an opacity substantially greater than that which could be produced with the frit used and clay alone, and in which a substantial part of the increased opacity is contributed by gas bubbles retained in the enamel, incorporating in the enamel slip containing clay, a gas-evolving agent which, upon the firing of the enamel, evolves gases which are retained in the enamel at the firing temperature thereof in the form of bubbles of such sizes and number as to contribute a substantial increase to the opacity, together with a glossing agent for the enamel, selected from the group consisting of hydrochloric acid, ammonium chloride and compounds capable of yielding hydrochloric acid.

2. In a method of producing a metallic article having thereon a coating of clouded vitreous enamel having an opacity substantially greater than that which could be produced with the frit used and clay alone, and in which a substantial part of the increased opacity is contributed by gas bubbles retained in the enamel, incorporating in the enamel slip containing clay, a gas-evolving agent which, upon the firing of the enamel, evolves gases which are retained in the enamel at the firing temperature thereof in the form of bubbles of such sizes and number as to contribute a substantial increase to the opacity, together with a glossing agent for the enamel comprising ammonium chloride.

3. In a method of producing a metallic article having thereon a coating of clouded vitreous enamel having an opacity substantially greater than that which could be produced with the frit used and clay alone, and in which a substantial part of the increased opacity is contributed by gas bubbles retained in the enamel, incorporating in the enamel slip containing clay, a gas-evolving agent which, upon the firing of the enamel, evolves gases which are retained in the enamel at the firing temperature thereof in the form of bubbles of such sizes and number as to contribute a substantial increase to the opacity, together with a glossing agent for the enamel comprising ammonium chloride substantially in an amount from 0.5 to 2 parts per 1,000 parts of frit.

4. In vitreous enamelling, the method of improving the gloss which comprises incorporating in the slip ammonium chloride.

IGNAZ KREIDL.